April 10, 1956  H. C. L. MILLER ET AL  2,740,990
METHOD FOR MAKING COMPOSITION BOARD
Filed Oct. 5, 1951  3 Sheets-Sheet 1

INVENTOR
HENRY C. L. MILLER
ROY H. SIDES
BY
ATTORNEY

April 10, 1956  H. C. L. MILLER ET AL  2,740,990
METHOD FOR MAKING COMPOSITION BOARD
Filed Oct. 5, 1951  3 Sheets-Sheet 2
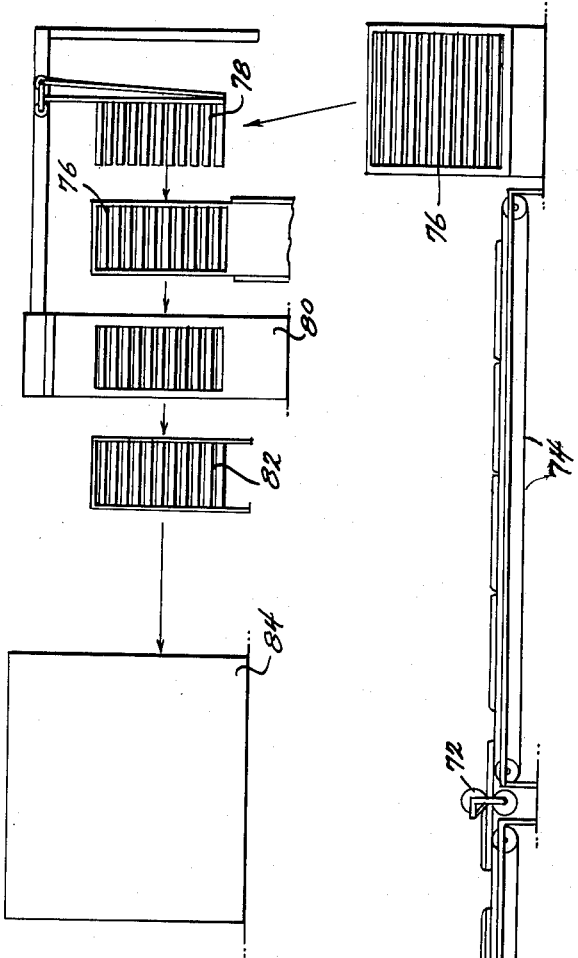
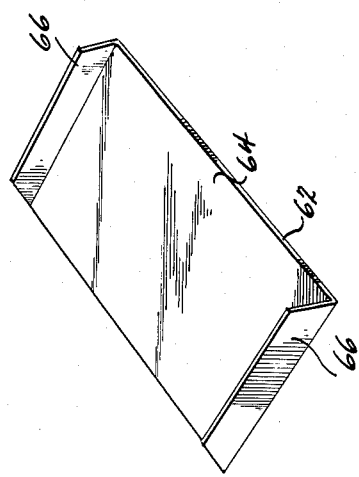
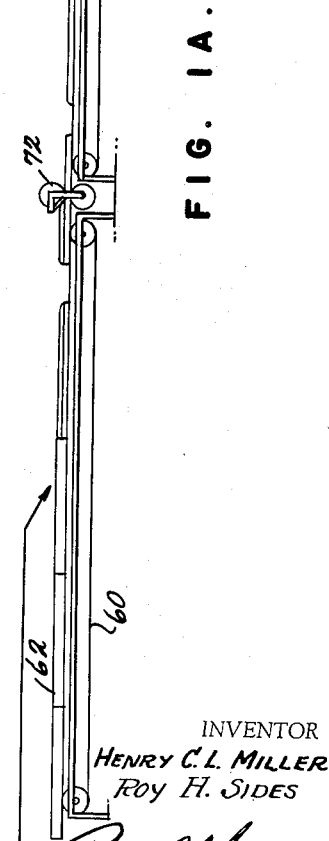
INVENTOR
HENRY C. L. MILLER
ROY H. SIDES
BY
ATTORNEY April 10, 1956  H. C. L. MILLER ET AL  2,740,990
METHOD FOR MAKING COMPOSITION BOARD
Filed Oct. 5, 1951  3 Sheets-Sheet 3

INVENTOR
**HENRY C. L. MILLER
ROY H. SIDES**

BY
ATTORNEY

United States Patent Office 2,740,990
Patented Apr. 10, 1956

2,740,990

METHOD FOR MAKING COMPOSITION BOARD

Henry C. L. Miller and Roy H. Sides, Richmond, Va., assignors to Miller Hofft, Incorporated, Richmond, Va., a corporation of Delaware Application October 5, 1951, Serial No. 249,984

5 Claims. (Cl. 18—47.5)

It is an object of this invention to provide a new and improved method of forming boards from what would otherwise be waste material.

The above and other objects will be made clear from the following detailed description taken in connection with the annexed drawings.

Every wood-working plant develops a great deal of waste. In a furniture factory the waste is in the form of shavings, sawdust, cut-out defective pieces of lumber and veneer, edge and trim, etc.

The present invention contemplates the shredding or hogging of the large pieces, the use of a cyclone and screen to obtain a substantially uniform, fairly large particle size, a drying operation where green or wet wood is involved, then mixing the dried chips with an admixture of resin and pulverulent filler. The mixture is then fed at substantially uniform thickness onto a conveyor in the form of a matte. This conveyor delivers the matte in sections onto a second and faster conveyor which acts to separate the sections. As the sections pass on either or both of the conveyors they go between pressure rolls which establish uniform, exact caliper. From the second conveyor the sections go to a hot press where the resin is cured.

The above and other objects will be understood from the following detailed description, taken in connection with the annexed drawings, in which:

Figure 1A is a continuation of Figure 1 showing the final forming, pressing and curing steps;

Figure 4 is a detail of one of the loading trays.

Figure 1:
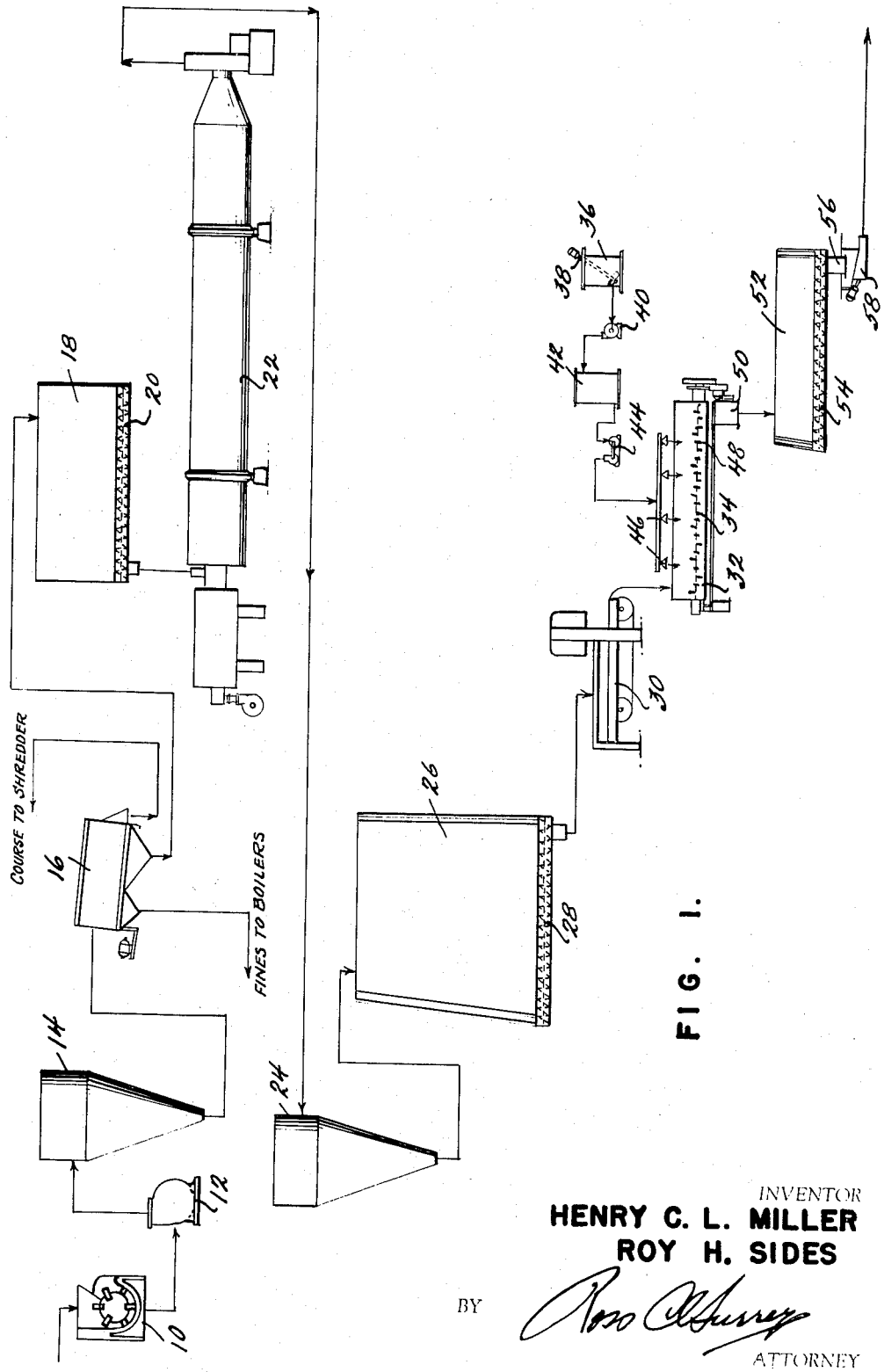
Figure 1 is a schematic diagram of the entire operation.

Referring now to Figure 1, a shredder 10 delivers chips to a blower 12 which feeds a cyclone 14 for the extraction of dust. From the cyclone the chips go to a screen 16 which extracts fines for delivery to the boilers and recirculate the coarse particles back to the shredder 10. Accepted chips go from the screen 16 to a green chip storage bin 18 whence screw conveyors 20 deliver the chips to a drier 22. From the drier the chips go to another cyclone 24 and thence to a dry chip storage bin 26. In a furniture factory or similar plant where the waste material is already dried the green chip storage bin 18, feeder 20 and the drier 22 will be omitted and the screen will deliver directly to the cyclone 24.

It has been found that extremes of particle size are deleterious to strength, uniformity and to machining characteristics of the product. The presence of oversized particles may disrupt the surface and adversely affect veneering. The presence of undersized particles, while making for a smoother surface, lowers the strength. Since appearance as such is unimportant it is essential to remove the fines. The screen 16 therefore is best designed to exclude particles over four mesh and under sixteen mesh. This board is therefore to be distinguished from the compressed sawdust boards of the prior art. The ultimate product will weight between thirty-five and thirty-eight pounds per cubic foot and will have a transverse modulus of about 2000 pounds per square inch. This contrasts with natural lumber which, while its modulus across the grain is in the region of 9000 pounds per square inch, has a modulus of only 900 pounds per square inch in the direction of the grain.

Because in this board, uniformity of strength and of density is of great importance it is most desirable to exclude, so far as practicable, particles which differ intrinsically in either strength or density from the desirable. For this reason any substantial proportion of bark or leaves, for example, would be most undesirable.

From the dry chip storage bin 26 screw conveyors 28 deliver the chips to a continuous weighing machine 30 which delivers the chips at a predetermined rate to a mixing tank 32 containing agitators 34. Resin and filler are delivered to a mixing tank 36 containing an agitator 38. A pump 40 delivers the mixture of resin and filler to a storage tank 42. From the storage tank 42 a metering pump 44 delivers the mixture of resin and filler at a predetermined rate to a series of spray nozzles 46 which feed into the mixing tank 32. The agitators 34 have pitched blades 48 which act not only to mix the chips with the resin and filler but to feed the chips forward to a spout 50. The spout 50 delivers the mixture to a treated chip storage tank 52. At the bottom of the chip storage tank 52 there are a series of parallel screw conveyors 54 which feed the mixture forward to a spout 56.

Depending on the nature of the wood and the plastic it is possible to form a "dry" mixture of chips and resin, in which case the mixing tank 36, agitator 38, pump 40, etc., need not be used.

From the spout 56 the mixture drops to a vibrating feeder 58. The feeder 58 is from four to eight feet in length. It is resiliently supported and vibrates at from 200 to 400 cycles per minute and an amplitude of 0.050" to 0.100". It is actually a chute and the vibration secures delivery of a uniform layer of mix to a conveyor 60.

At the head end of the conveyor 60 a series of open-sided trays 62 (Figure 4) are placed in end-to-end juxtaposition. Each tray 62 comprises a base 64 and turned up end flanges 66. The flanges 66 are beveled at each end.

Figure 2:
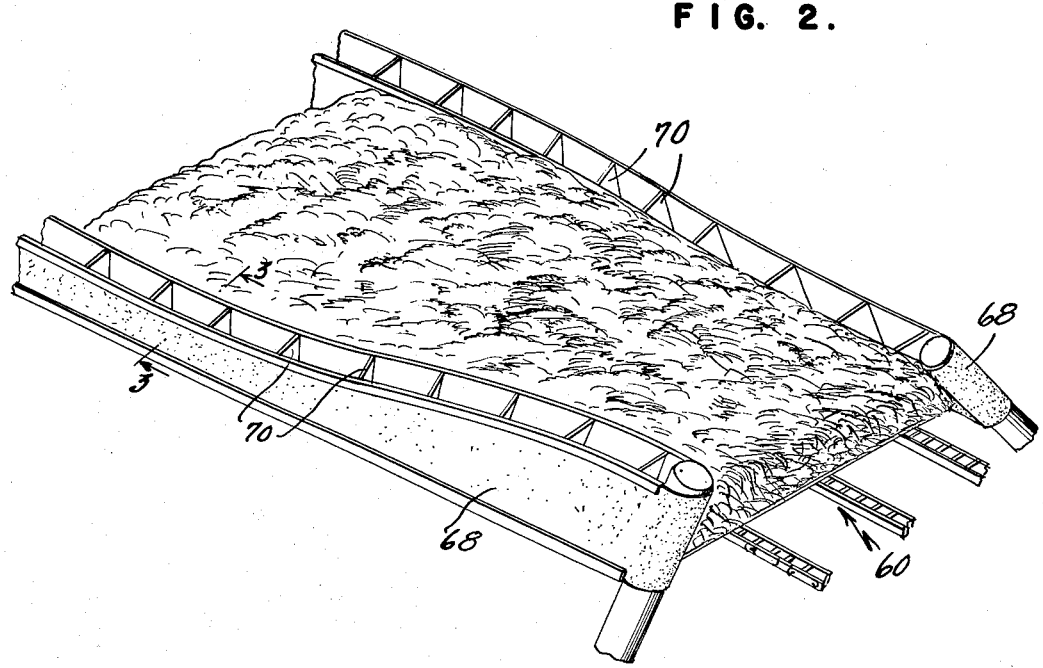
Figure 2 is a perspective view of a detail of the matte-forming equipment.
Figure 3:
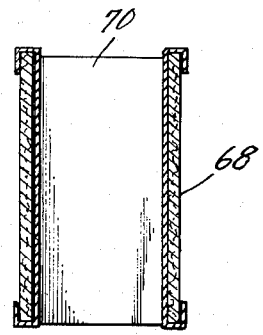
Figure 3 is a section on the line 3—3 of Figure 2.

At each side of the conveyor 60 is a belt 68 (Figure 2), the return flight of each belt being separated from the active flight by a spacing and sheathing frame 70 (Figure 3). The mixture drops from the vibrating feeder 58 in an even layer on the trays 62 and between the belts 68. At the discharge end of the conveyor 60, the spacer frames 70 are inclined toward each other as shown in Figure 2 to provide beveled edges for the matte.

As each tray 62 leaves the conveyor 60 it passes between sizing and compacting rolls 72, thence to a speed-up conveyor 74. The speed of the rolls 72 may equal that of either the slow conveyor 60 or the fast conveyors 74. In either case, due to the speed difference between the two conveyors, the trays 62, having been juxtaposed on the conveyor 60 are evenly spaced on the conveyor 74. The mass of chips at this point is incoherent, permitting ready separation of the trays.

Up to this point the entire operation has been continuous. Since, however, both heat and pressure for a substantial period of time are necessary to effect a final cure, there ensues what is essentially a batch operation.

At the discharge end of the speed-up conveyor 74, an attendant removes the trays 62 and places them, one above the other, in a press loading rack 76. When the rack 76 is filled it is loaded to the press by a press loader 78 and a new rack is started filling.

The press loader 78 loads the trays 62 from the loading rack 76 to a hot plate press 80 and, as part of the same operation, unloads a previous batch of trays to an unloading rack 82 whence they are transferred to storage 84, the trays 62 removed and sent back to the forming conveyor 60.

The conventional method of curing such material on a press of this type is to apply constant pressure in pounds per square inch. During the heating of the material it gradually compacts to final desired thickness. This means in case of a ⅞" final thickness, for example, that a heating period of from five to six minutes must elapse before the ultimate desired thickness is reached and an additional eight to nine minutes is required for heat to penetrate to the center of the slab and cure the resin binder. The overall time required, therefore, to cure a ⅞" thick slab is fourteen minutes.

We have discovered a way of speeding up cure of the material in the hot plate press. We do this by starting the cure, in the case of ⅞" final thickness, at a pressure of five-hundred pounds per square inch, which in itself is sufficient to compress the cold material immediately to its final thickness. This thickness is maintained during the heating step by gradual reduction of pressure. However, the immediate compression of the slab renders it at once more dense and, therefore, more conducive to heat with the result that not only is the compression then reduced but the heating time similarly reduced. By this new method, the entire cure can be accomplished in the case of ⅞" thick material in eight minutes or fifty-seven percent of the time required by conventional methods and thereby proportionately increasing the capacity of a given press. The control of press pressure, as above described, may obviously be done by automatic means.

It is to be noted that by keeping the chip size uniform and mediate, the core stock is extremely uniform in density and strength. The process, moreover, is flexible and considerable adjustment may be made of density and thickness. The raw material cost is virtually nil, apart from resin and extender, since it amounts to only the fuel value of the wood waste, and this is notoriously low.

The following is a concrete example of one preferred formulation:

| | |
|---|---|
| Chips | 100# |
| Liquid resin ¹ | 7.5# |
| Extender | 3.75# |
| Water | 3.75# |
| Final product | 35#/cu. ft. |
| Pressure of cure | 500 initial to 230 final |
| Temperature of press platens | 290° F. |
| Time of cure | 8–9 min. |
| Thickness | ⅞" |

¹ 68% solids.

The use of this method and apparatus to produce this improved core-stock will be extremely profitable to any mill producing wood waste since it will produce core-stock much cheaper than the usual lumber core-stock.

We claim:

1. A method of making composition board comprising: continuously forming an incoherent mixture of wood chips sized to pass a substantially 4 mesh screen and be retained on a substantially 16 mesh screen with a thermosetting binder; depositing said mixture as an incoherent layer in a series of immediately juxtaposed continually advancing trays; separating the trays by speeding up the motion of consecutive trays, subjecting the incoherent layer of chips in each tray to a preliminary vertical compacting action just prior to the separational speed-up of the trays and subjecting trays and contents to heat and pressure to cure the binder and establish each tray load as a coherent panel.

2. A method as set forth in claim 1 in which the resin is extended about 50 percent by the use of a pulverulent extender.

3. A method as set forth in claim 1 including the step of continuously beveling, by compaction, the edges of each layer of chips parallel to the direction of advance of such layer.

4. A method of making composition board comprising: continuously advancing metered quantities of wood chips and binder while mixing such quantities; continuously advancing a series of trays juxtaposed in the direction of advance; continuously distributing the mixture of chips and binder as a uniform layer on the advancing trays; thereafter accelerating the advance of consecutive trays to provide substantial spacing between consecutive trays; intermediate the original advance of said trays and the accelerative spacing thereof, subjecting the contents of each tray to a compressive action; thereafter subjecting each tray and contents to heat and pressure to establish each tray load as a coherent panel.

5. A method as set forth in claim 4 including the step of continuously beveling, by compaction, the edges of each layer of mixture parallel to the direction of advance of such layer.

References Cited in the file of this patent

UNITED STATES PATENTS

| | | |
|---|---|---|
| 1,728,373 | Shipley | Sept. 17, 1929 |
| 2,156,160 | Olson | Apr. 25, 1939 |
| 2,377,392 | Wiley | June 5, 1945 |
| 2,379,163 | Landon | June 26, 1945 |
| 2,446,782 | Otis et al. | Aug. 10, 1948 |
| 2,485,587 | Goss | Oct. 25, 1949 |
| 2,486,346 | Wachs | Oct. 25, 1949 |
| 2,581,652 | Goss | Jan. 8, 1952 |
| 2,618,813 | Patton et al. | Nov. 25, 1952 |

FOREIGN PATENTS

| | | |
|---|---|---|
| 559,974 | Great Britain | Mar. 14, 1944 |